US008896868B2

United States Patent
Daos et al.

(10) Patent No.: US 8,896,868 B2
(45) Date of Patent: Nov. 25, 2014

(54) MOBILE DEVICE IMPLEMENTING NEAR FIELD COMMUNICATION TO PRINT WITH MULTIFUNCTION PERIPHERAL DEVICE

(71) Applicant: Toshiba Tec Kabushiki Kaisha, Tokyo (JP)

(72) Inventors: Brenda Daos, Mission Viejo, CA (US); Sheng Lee, Irvine, CA (US)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 12 days.

(21) Appl. No.: 13/754,582

(22) Filed: Jan. 30, 2013

(65) Prior Publication Data

US 2013/0201515 A1 Aug. 8, 2013

Related U.S. Application Data

(60) Provisional application No. 61/596,335, filed on Feb. 8, 2012.

(51) Int. Cl.
```
G06F 3/12      (2006.01)
H04M 1/725     (2006.01)
G06F 1/16      (2006.01)
H04N 1/00      (2006.01)
G06F 3/0484    (2013.01)
H04W 4/00      (2009.01)
H04L 29/12     (2006.01)
H04W 8/00      (2009.01)
H04L 29/08     (2006.01)
```

(52) U.S. Cl.
CPC .......... *H04N 1/00095* (2013.01); *G06F 3/1228* (2013.01); *H04W 4/008* (2013.01); *H04N 2201/006* (2013.01); *G06F 3/1285* (2013.01); *H04M 1/72533* (2013.01); *G06F 1/1698* (2013.01); *H04N 2201/3242* (2013.01); *H04N 2201/0015* (2013.01); *H04L 61/2038* (2013.01); *H04W 8/005* (2013.01); *H04N 2201/0075* (2013.01); *H04N 2201/0094* (2013.01); *G06F 3/1203* (2013.01); *G06F 3/1292* (2013.01); *G06F 3/1222* (2013.01); *H04N 1/00204* (2013.01); *G06F 3/1259* (2013.01); *G06F 3/1268* (2013.01); *G06F 3/04842* (2013.01); *H04L 67/16* (2013.01); *H04N 2201/3278* (2013.01); *H04N 2201/3209* (2013.01); *H04N 2201/3208* (2013.01)
USPC .......................................................... 358/1.15

(58) Field of Classification Search
CPC .......................... G06F 3/1292; H04N 1/00106
USPC .......................................................... 358/1.15
See application file for complete search history.

(56) References Cited

U.S. PATENT DOCUMENTS 7,265,858 B2 * 9/2007 Park et al. ..................... 358/1.15
8,060,012 B2 11/2011 Sklovsky et al.
(Continued)

*Primary Examiner* — Eric A Rust
(74) *Attorney, Agent, or Firm* — SoCal IP Law Group LLP; Steven C. Sereboff; Jonathan Pearce

(57) ABSTRACT

There is disclosed a method of, mobile device for and apparatus for using a mobile device to actuate a multifunction peripheral device using near field communication. The mobile device includes a user interface for receiving a selection of an electronic document and instructions regarding a selected document processing operation to be performed by the multifunction peripheral and for receiving a selection of an electronic address to which the electronic document is to be directed by the multifunction peripheral. The mobile device also includes a first near field communications transceiver for receiving input indicating that the mobile device is within range of a second near field communication transceiver, for receiving communication, at the first near field transceiver from the second near field communication transceiver, indicating that the first near field communication transceiver is ready to accept the electronic document, instructions pertaining to the selected document processing operation, and the electronic address.

16 Claims, 7 Drawing Sheets

(56) References Cited

U.S. PATENT DOCUMENTS

| | | |
|---|---|---|
| 8,229,354 B2 | 7/2012 | Sklovsky et al. |
| 2007/0182984 A1 | 8/2007 | Ragnet et al. |
| 2008/0004075 A1 | 1/2008 | Horton |
| 2008/0112015 A1* | 5/2008 | Liu .............................. 358/402 |
| 2008/0120369 A1 | 5/2008 | Gustavsson |
| 2008/0130060 A1* | 6/2008 | Gotou et al. .................. 358/402 |
| 2009/0052348 A1* | 2/2009 | Kato et al. ................... 358/1.15 |
| 2009/0103124 A1* | 4/2009 | Kimura et al. ............... 358/1.15 |
| 2011/0319016 A1 | 12/2011 | Gormley et al. |

* cited by examiner

MOBILE DEVICE IMPLEMENTING NEAR FIELD COMMUNICATION TO PRINT WITH MULTIFUNCTION PERIPHERAL DEVICE

RELATED APPLICATION INFORMATION

This patent claims priority from U.S. Patent Application No. 61/596,335 entitled "Print from Mobile Device using NFC" filed Feb. 8, 2012.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to mobile device actuation of a multifunction peripheral using near field communication (NFC).

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as a document, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may also provide remote document processing services to external or network devices.

Wireless (and in some cases so-called "driverless") print capabilities are available for mobile devices. These applications typically rely upon internet printing protocol (IPP) to enable printing coupled with auto-discovery protocols (such as provided by the common Unix printing system (CUPS) or Bonjour) to enable mobile devices within range of the appropriate network to discover those printers to which they are able to connect and print. These networks may be implemented using Bluetooth® or wireless internet protocols. These protocols enable data transmission in ranges of approximately 0-30 feet or 0-300 feet, respectively. Though, network ranges vary widely dependent upon the implementation and the surroundings of the network.

However, these wireless print capabilities are often insecure (due to their auto-discovery features) and the varyingly wide area of network availability. Signals transmitted between mobile devices and printing devices may be intercepted. Similarly, due to the limitations of these wireless print capabilities, determining whether a print job has begun, completed or even been transmitted is sometimes difficult. Most printing devices have limited methods for authenticating a print request or for confirming receipt of the request. In order to interact in these ways, the installation of a print driver and associated software is typically required. However, finding the correct printer on a network, obtaining access rights to the printer, and installing a print driver into a mobile device is complex and significantly impedes the ease-of-use by a user of the device.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
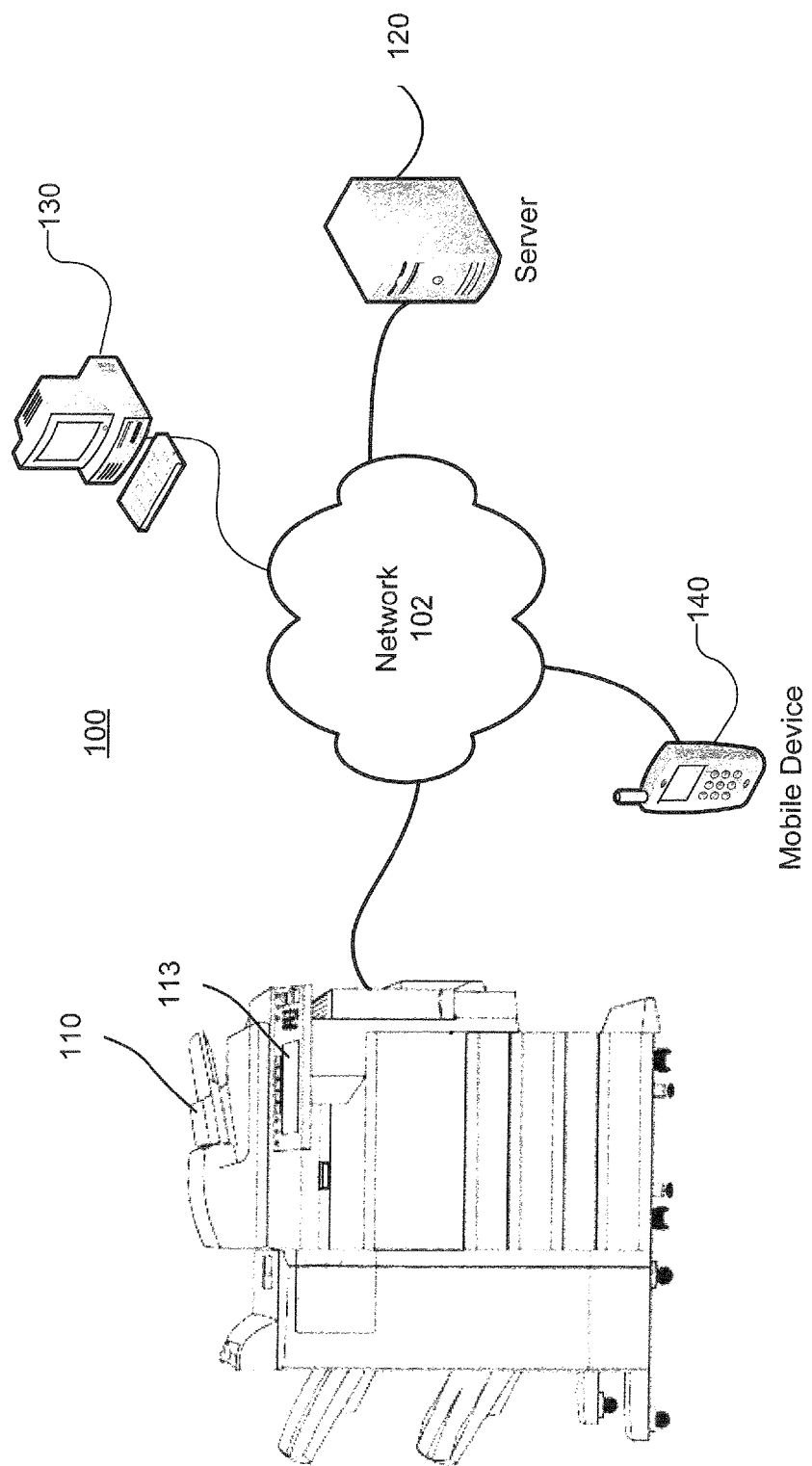
FIG. 1 is a diagram of an MFP system.

Referring now to FIG. 1 there is shown an MFP system 100. The system 100 includes an MFP 110, a server 120, a client computer 130, and a mobile device 140, all interconnected by a network 102. The system 100 may be implemented in a distributed computing environment and interconnected by the network 102.

The network 102 may be a local area network, a wide area network, a personal area network, the Internet, an intranet, or any combination of these. The network 102 may have physical layers and transport layers according to IEEE 802.11, Ethernet or other wireless or wire-based communication standards and protocols such as WiMax®, Bluetooth®, the public switched telephone network, a proprietary communications network, infrared, near field communications and optical.

The MFP 110 may be equipped to receive portable storage media such as USB drives. The MFP 110 includes a user interface subsystem 113 which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alphanumeric keypad and/or an associated thin client through which a user may interact directly with the MFP 110.

The server 120 is a server computer running software and connected to the network. The client computer 130 may be a PC, thin client or other device. The client computer 130 is representative of one or more end-user devices. The mobile device 140 may be a smart phone, tablet computer, mobile phone, or other portable computing device. The mobile device is a computing device that is not always resident in a particular location.

Figure 2:
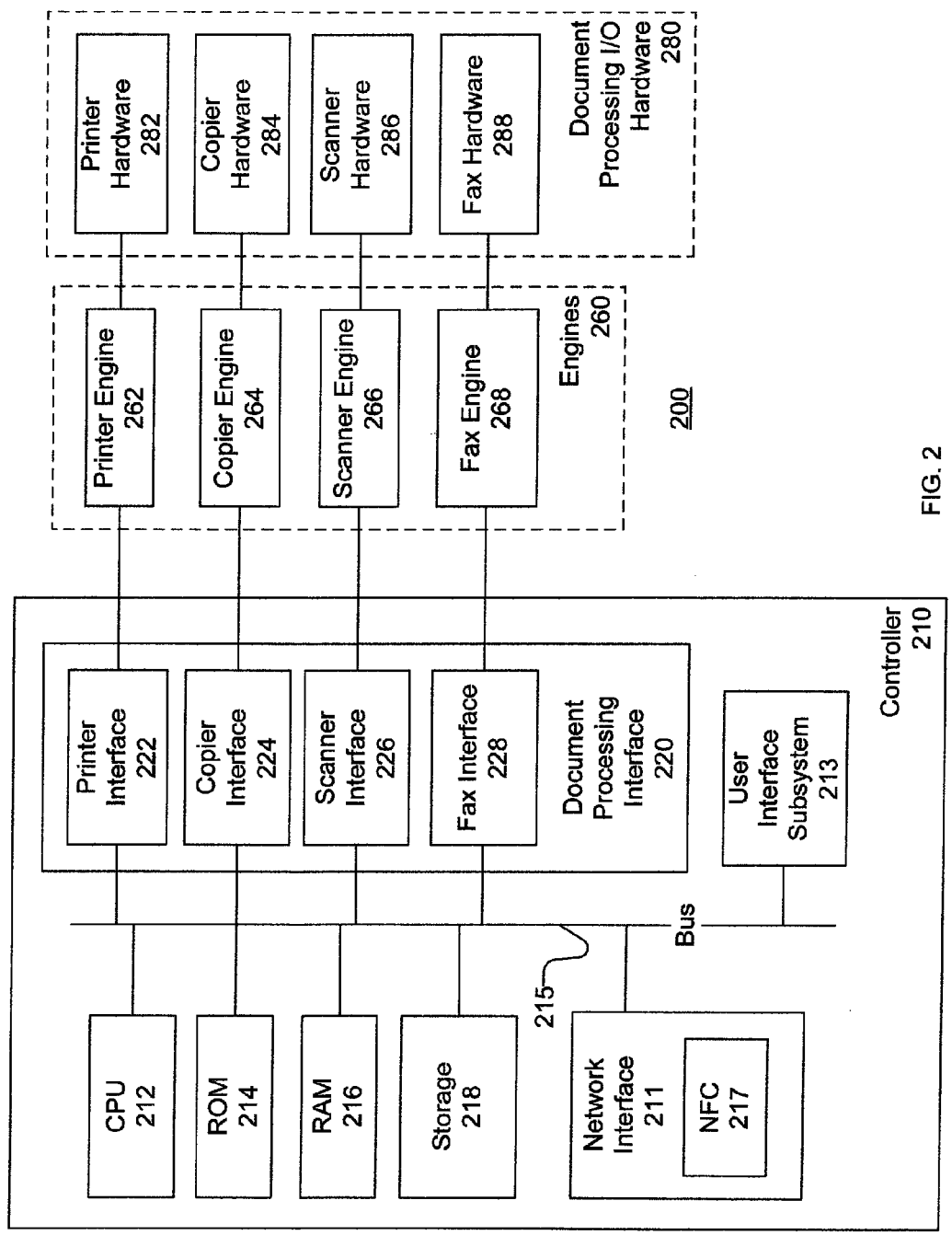
FIG. 2 is a block diagram of an MFP.

Turning now to FIG. 2 there is shown a block diagram of an MFP 200 which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state storage. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 allowing the MFP 200 to communicate with other devices. The network interface 211 may also include a near field communications (NFC) interface 217 including a NFC transceiver so that the MFP may communicate with other devices via NFC wireless communications protocols.

The bus 215 enables data communication between devices and systems within the MFP 200. The bus 215 may conform to the, PCI, PCI Express, or another bus standard.

The MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may include software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions. These engines may include software, firmware, hardware or a combination thereof that enable the document processing interface 220 to communicate with the document processing I/O hardware 280.

Figure 3:
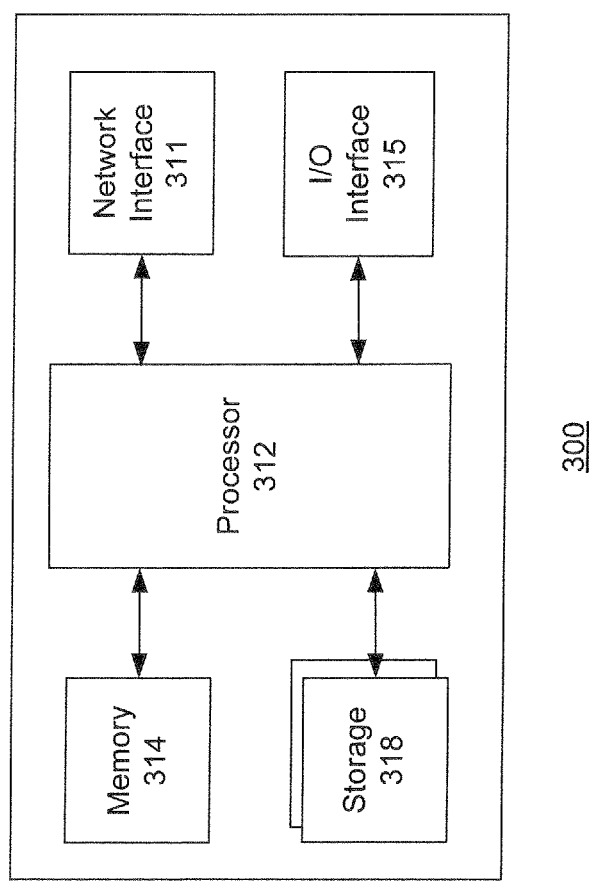
FIG. 3 is a block diagram of a computing device.

Turning now to FIG. 3 there is shown a computing device 300, which is representative of the server computers, client computers and other computing devices discussed herein. The controller 210 may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, field programmable gate arrays (FPGAs), application specific integrated circuits (ASICs), programmable logic devices (PLDs) and programmable logic arrays (PLAs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

As used herein, the term storage medium corresponds to the storage 318 and does not include transitory media such as signals or waveforms.

The network interface 311 includes an interface to a network such as network 102. The network interface may include a near field communications transceiver for communicating with other devices employing near field communications transceivers.

The I/O interface 315 interfaces the processor 312 to peripherals (not shown) such as displays, keyboards and USB devices.

Figure 4:
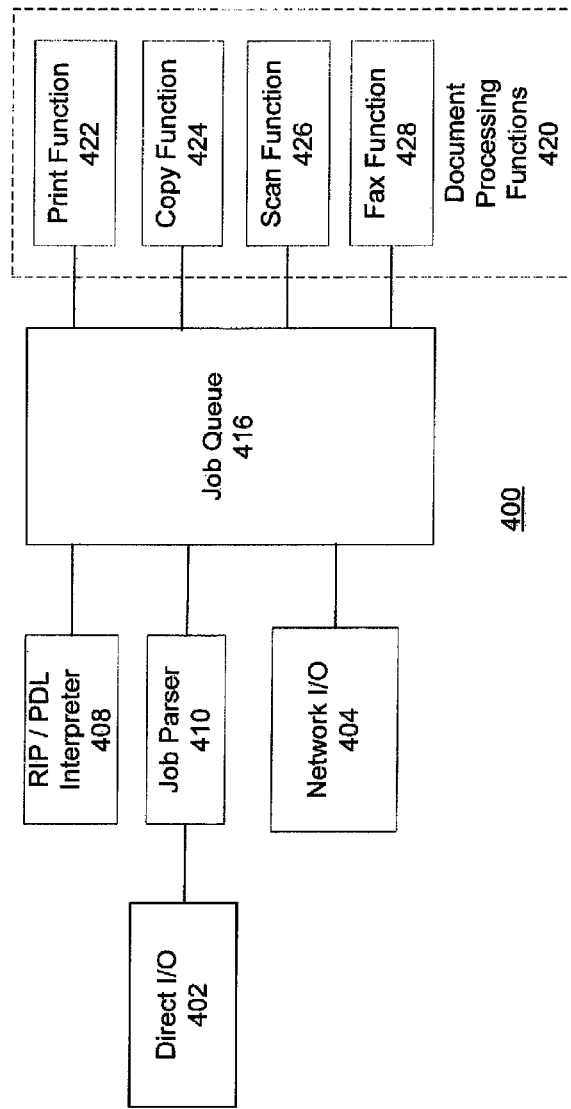
FIG. 4 is a block diagram of a software system for an MFP.

Turning now to FIG. 4 there is shown a block diagram of a software system 400 of an MFP which may operate on the controller 210 (FIG. 2). The system 400 includes direct I/O 402, network I/O 404, a RIP/PDL interpreter 408, a job parser 410, a job queue 416, a series of document processing functions 420 including a print function 422, a copy function 424, a scan function 426 and a fax function 428.

The direct I/O 402 and the network I/O 404 provide input and output to the MFP controller. The direct I/O 402 is for the user interface on the MFP (e.g., user interface subsystem 113), and the network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail, TELNET, or other network communication protocols. The direct I/O 402 and/or the network I/O 404 may include or interact to include near field communications (NFC) capabilities.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the direct I/O 402. The direct I/O 402 may include printing, fax transmission or other input of a document for handling by the system 400.

The print function 422 enables the MFP to print documents and implements each of the various functions related to that process using the printer interface 222. These include stapling, collating, hole punching, and similar functions. The copy function 424 enables the MFP to perform copy operations and all related functions such as multiple copies, collating, 2 to 1 page copying or 1 to 2 page copying and similar functions using the copier interface 224. Similarly, the scan function 426 enables the MFP to scan and to perform all related functions such as shrinking scanned documents, storing the documents on a network or emailing those documents to an email address using the scanner interface 226. The fax function 428 enables the MFP to perform facsimile operations and all related functions such as multiple number fax or auto-redial or network-enabled facsimile using the fax interface 228.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

The relative position of various parts of the platform 100 will be described based upon this view. For example, terms such as top, bottom, left and right are used. However, the platform 100 may be used in various positions such as upside down. Thus, some descriptive terms are used in relative terms and not absolute terms.

Figure 5:
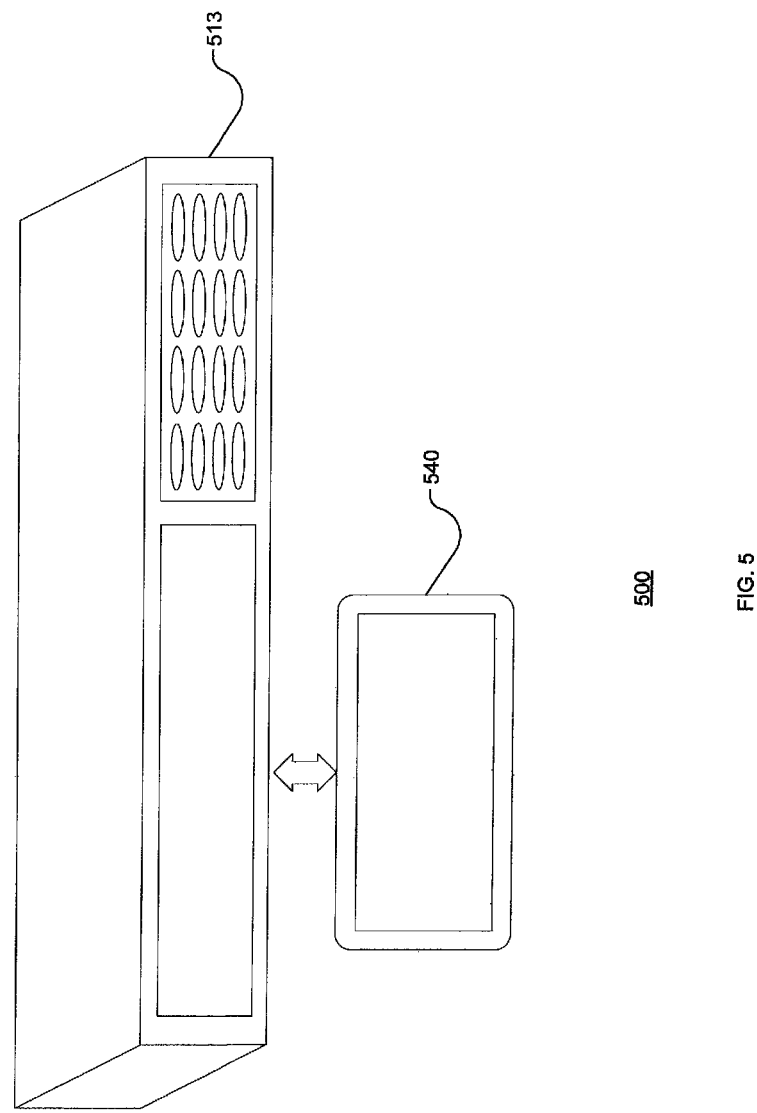
FIG. 5 is a subset of a MFP system including a user interface subsystem and a mobile device.

Referring now to FIG. 5, a subset of a MFP system 500 including a user interface subsystem 513 and a mobile device 540 are shown. As the mobile device 540 is moved within close proximity of the user interface subsystem 513, the NFC capability of both the MFP system 500 and mobile device 540 may be enabled. The process of initiating NFC communication may require a user to enable capabilities or to make a selection on the mobile device 540, on the user interface subsystem 513, or both. The initiation process may also involve "tapping" the mobile device 540 to the user interface subsystem 513. Tapping may serve as an indication to the mobile device 540 and the user interface subsystem 513 that the mobile device 540 is within a sufficiently close proximity to the user interface subsystem 513 that NFC communication may begin. In some cases, proximity alone may be sufficient to enable NFC communications.

Description of Processes

Figure 6:
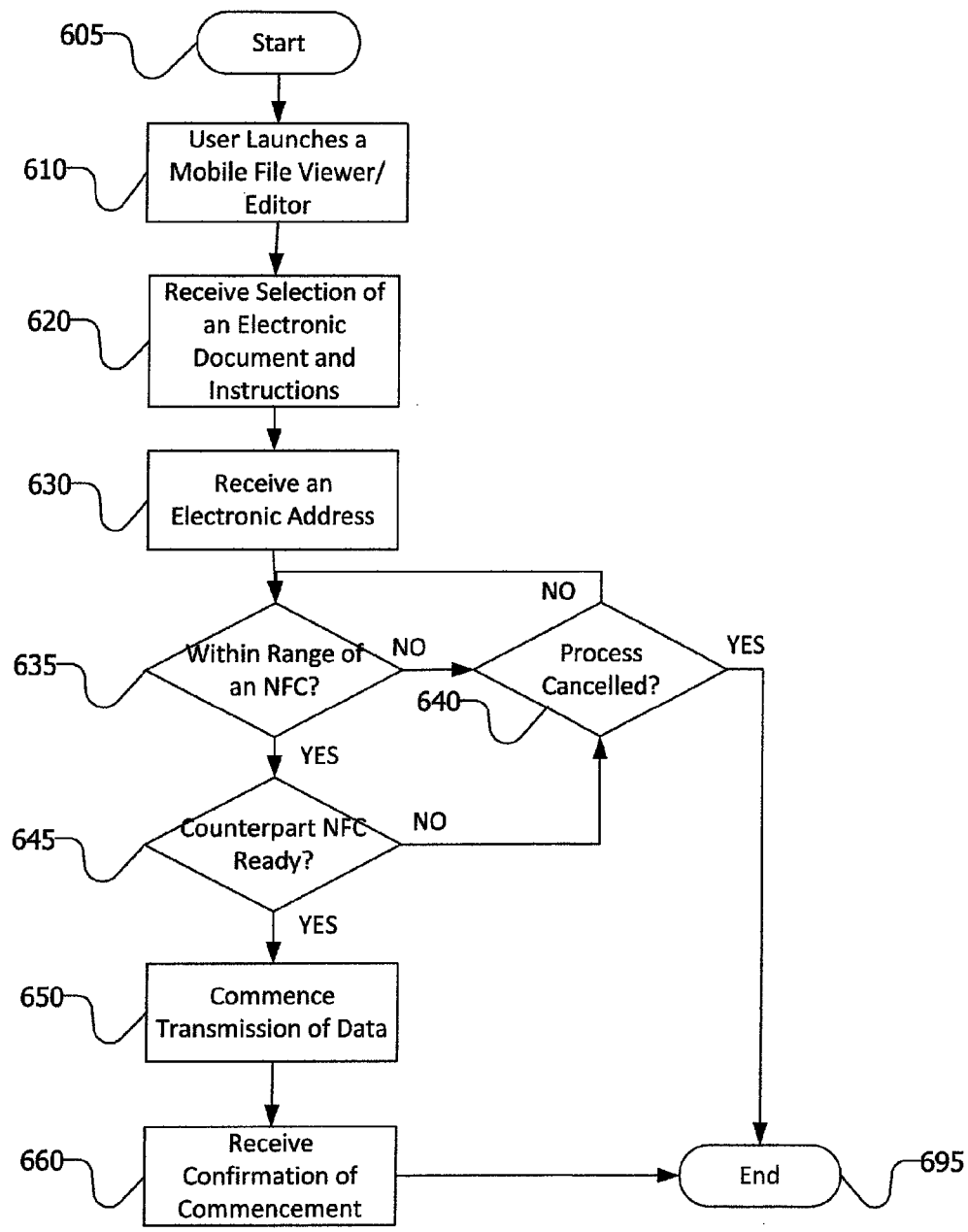
FIG. 6 is a flowchart of the process of mobile device actuation of a multifunction peripheral using near field communication from the perspective of the mobile device.

Referring now to FIG. 6, a flowchart of the process of mobile device actuation of a multifunction peripheral using near field communication from the perspective of the mobile device is shown. The flow chart has both a start 605 and an end 695, but the process is cyclical in nature and more than one instance of the process shown may take place simultaneously or in parallel.

The process begins when a user launches a mobile file viewer or editor at 610. This mobile file viewer may be a mobile document viewer such as a text, PDF, HTML or image viewer. A mobile file editor may be a document editor, such as a web-based text editor, an editor that operates on a mobile device or a cloud (or network) storage access application that enables a user to view or edit files stored in the cloud (or on the network).

While using the mobile file viewer or editor at 610, the user may make a selection of an electronic document and instruction related to the document that is received by the mobile device at 620. This may entail opening an electronic document, editing the document and indicating that the user wishes to output the electronic document using NFC. The user may use software on the mobile device to navigate to a cloud or network server or data store in order to access the electronic document.

As a part of the process of actuating the multifunction peripheral, the mobile device receives an electronic address at 630 that is selected by the user. The electronic address may take many forms. The electronic address may be the MFP itself, and the requested document processing operation may be printing. The electronic address may be a facsimile number to which the electronic document is to be sent via facsimile by an MFP. If the electronic address is a facsimile number, the electronic address may be obtained by the MFP directly from the mobile device. The facsimile number may be selected by a user of the mobile device from the mobile device's contact list.

The electronic address may be a server location either in the cloud or on a network. If the electronic address is a server location, then authentication may be provided along with the address in order to enable the MFP to access the server location. This authentication may include a username and password or other authentication methods. Alternatively, the mobile device may not have access to the server location, but the MFP itself may have access. The authentication step in such a situation is the mobile device's proximity to the MFP. Because the mobile device has requested printing from a specific MFP, that user may be granted write access of a selected file on the mobile device to the server location only by interacting with the MFP that has such access.

Once the electronic address is received by the mobile device at 630, the mobile device may, automatically or through user interaction, begin searching for nearby NFC transceivers with which the mobile device can communicate. This search operates by activating the mobile device radio frequency (RF) field with sufficient power to power a nearby passive NFC target. The target is the receiver portion of a nearby NFC transceiver on the MFP. Once the passive receiver of the MFP's NFC transceiver is activated, communications are initiated. During this process, the mobile device and MFP may exchange authentication data suitable for opening a communication connection using other, available wireless protocols, such as a Bluetooth®, WiFi, Internet or other communication. These other communication protocols, once authenticated by the NFC process, may be as secure as the NFC communication process and may operate more quickly when large amounts of data are being exchanged. However, NFC-only communication is the default method of communication.

If the mobile device is not within range of an NFC at 635, then a determination is made whether the process has been cancelled at 640. If the process is not cancelled, a determination is again made whether the mobile devices is within range of an NFC. Once the mobile device confirms that it is within range of an NFC at 635, a second determination is made whether the counterpart NFC (in the MFP) is ready for data transfer at 645.

This process may require the NFC transceiver in the mobile device and the NFC transceiver in the MFP to handshake and, in some cases, to exchange authentication or encryption data to ensure security of the transmission. In addition, the requirement of very close proximity of NFC transmissions serves to further ensure security of the exchange of data. Because NFC transceivers must be within less than a few inches of each other to function, it is extremely unlikely that another NFC would be capable of intercepting the communication of data between the two NFC transceivers.

Once it is confirmed that the counterpart NFC in the MFP is ready at 645, the mobile device then commences transmission of data at 650. This process may involve only the use of the NFC transceivers or, as described above, may involve the use of other networks, such as Bluetooth®, WiFi or the Internet, once the NFC transceivers have opened communication channels, exchanged authentication and, if necessary, exchanged data suitable to enable encryption of data transmitted over non-NFC transceivers.

The mobile device then receives confirmation of commencement of the document processing operation identified by the instructions at 660. In this way, the user of the mobile device immediately knows whether or not the requested document processing operation will commence. Unlike other "driverless" MFP systems that involve protocols that typically do not enable the mobile device to receive any confirmation of receipt of a document processing operation or of completion of a document processing operation.

Figure 7:
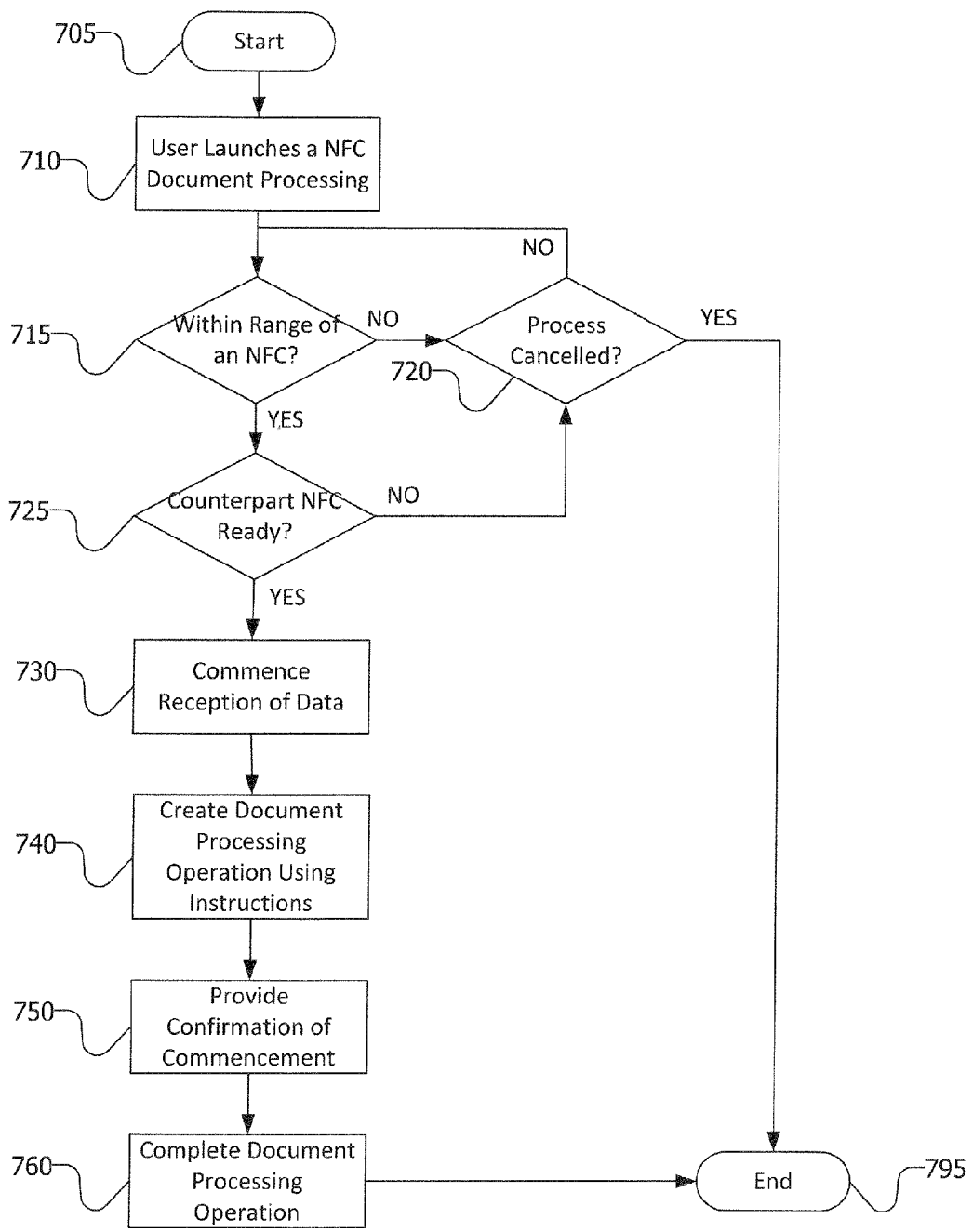
FIG. 7 is a flowchart of the process of mobile device actuation of a multifunction peripheral using near field communication from the perspective of the multifunction peripheral.

FIG. 7 shows a flowchart of the process of mobile device actuation of a multifunction peripheral using near field communication from the perspective of the multifunction peripheral. The flow chart has both a start 705 and an end 795, but the process is cyclical in nature and more than one instance of the process shown may take place simultaneously or in parallel.

The process begins when the user launches NFC document processing at 710. This may be a required step on an MFP to enable the MFP to accept NFC documents. However, this may take place only once after which the MFP may be enabled. Because NFC merely awaits activation by a device, such as the mobile device, using a powered radio frequency signal, the power use of the MFP while awaiting a NFC communication is virtually none. Alternatively, the MFP may be set, for example, by an administrator, to require a user to specifically launch the NFC document processing at 710 each time a user wishes to utilize NFC document processing on the MFP.

Next, the MFP awaits interaction from a nearby NFC. If no other NFC transceiver is found to be within range at 715, then a determination is made whether the process has been cancelled at 720. If the process has not been cancelled at 720, then the MFP NFC transceiver continues awaiting another NFC transceiver within range at 715.

Once another NFC transceiver is found to be within range at 715, a determination is made, via communication between the two NFC transceivers, whether the other NFC transceiver (in the mobile device) is ready for communication at 725. If the counterpart NFC is not ready for communication at 725, then a determination is made whether the process has been cancelled at 720.

If the counterpart NFC is ready at 725, then the MFP commences reception of data at 730 from the mobile device. This data includes the electronic document, the instructions and the electronic address identified with respect to FIG. 6.

In response to receipt of this data, the MFP creates a document processing operation using the instructions at 740. The document processing operation is created using the electronic document with delivery to be provided to the electronic address. For example, if the instructions indicate that the electronic document is to be sent via facsimile and the electronic address is the facsimile number, the document is formatted for facsimile and the MFP creates a document processing operation to send the document to the identified facsimile number.

Alternatively, if the instructions indicate that the electronic document is to be stored to a local network share and the electronic address is the location of the network share along with user authentication associated with the user of the mobile device, then the MFP will create an electronic version of the document, gain access to the network share using the user authentication provided by the user of the mobile device and then store the document in the location specified by the user in the network share. A similar process may be used for storing the document in a cloud-based storage location.

Similarly, a plurality of documents may be sent simultaneously, all with one or more facsimile numbers, cloud storage locations or network share locations to which each of the electronic documents are to be sent. In this way, the processing associated with these actions may be offloaded from a relatively low-power mobile device to an MFP that, in most typical operating scenarios is never fully utilized throughout a given day.

The MFP may then provide confirmation of the commencement of the document processing operation at 750. This step is unavailable in so-called "driverless" printing operations. Afterward, the MFP may complete the document processing operation at 760 as directed by the instructions by directing the resulting electronic document to the desired electronic address.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of using a mobile device to actuate a multi-function peripheral device using near field communication comprising:
    receiving, via the mobile device, a selection of an electronic document and instructions regarding a selected document processing operation to be performed by the multifunction peripheral;
    receiving, via the mobile device, selection of an electronic address including one of a server location and a network storage location to which the electronic document is to be directed by the multifunction peripheral;
    receiving, at the mobile device, communication indicating that the mobile device is within operable range of a near field communication transceiver used by the multifunction peripheral and communication indicating that the multifunction peripheral is ready to accept the electronic document, instructions pertaining to the selected document processing operation, and the electronic address;
    commencing transmission of the electronic document, the instructions, and the electronic address from the mobile device to the multifunction peripheral;
    receiving, at the mobile device, confirmation that the selected document processing operation has begun transmission of the electronic document to the electronic address in accordance with the instructions.

2. The method of claim 1 where in the electronic address is obtained from software operating on the mobile device.

3. The method of claim 2 wherein the electronic address is obtained from a contact list stored on the mobile device.

4. The method of claim 2 wherein the electronic address is provided in conjunction with authentication data necessary to access the electronic address.

5. The apparatus of claim 2 wherein the electronic address is provided in conjunction with authentication data necessary to access the electronic address.

6. The method of claim 1 wherein the communication indicating that the mobile device is within operable range of the near field communication transceiver used by the multifunction peripheral comprises a user tapping the mobile device on the multifunction peripheral.

7. A mobile device for actuating a multifunction peripheral device using near field communication comprising:
    a user interface for receiving a selection of an electronic document and instructions regarding a selected document processing operation to be performed by the multifunction peripheral and for receiving a selection of an electronic address including one of a server location and a network storage location to which the electronic document is to be directed by the multifunction peripheral; and
    a first near field communications transceiver for
        receiving input indicating that the mobile device is within range of a second near field communication transceiver used by the multifunction peripheral,
        for receiving communication, at the first near field transceiver from the second near field communication transceiver and communication indicating that the multifunction peripheral is ready to accept the electronic document, instructions pertaining to the selected document processing operation, and the electronic address;
        commencing transmission of the electronic document, the instructions, and the electronic address to the multifunction peripheral, and
        receiving at the mobile device confirmation that the selected document processing operation has begun transmission of the electronic document to the electronic address in accordance with the instructions.

8. The mobile device of claim 7 where in the electronic address is obtained from software operating on the mobile device.

9. The mobile device of claim 8 wherein the electronic address is obtained from a contact list stored on the mobile device.

10. The mobile device of claim 8 wherein the electronic address is provided in conjunction with authentication data necessary to access the electronic address.

11. The mobile device of claim 7 wherein the input indicating that the mobile device is within range of the near field communication transceiver comprises a user tapping the mobile device on the multifunction peripheral.

12. The apparatus of claim 11 wherein the communication indicating that the mobile device is within operable range of the near field communication transceiver used by the multifunction peripheral comprises a user tapping the mobile device on the multifunction peripheral.

13. The apparatus of claim 11 further comprising:

a processor a memory wherein the processor and the memory comprise circuits and software for performing the instructions on the storage medium.

14. An apparatus comprising a storage medium storing a mobile device program having instructions which when executed by a processor will cause the processor to actuate a multifunction peripheral device using near field communication, the instructions of the mobile device program for:

receiving, via a mobile device, a selection of an electronic document and instructions regarding a selected document processing operation to be performed by the multifunction peripheral;

receiving, via the mobile device, selection of an electronic address including one of a server location and a network storage location to which the electronic document is to be directed by the multifunction peripheral;

receiving communication indicating that the mobile device is within operable range of a near field communication transceiver used by the multifunction peripheral;

receiving, at the mobile device, communication from the near field communication transceiver indicating that the multifunction peripheral is ready to accept the electronic document, instructions pertaining to the selected document processing operation, and the electronic address;

commencing transmission of the electronic document, the instructions, and the electronic address from the mobile device to the multifunction peripheral;

receiving, at the mobile device, confirmation that the selected document processing operation has begun transmission of the electronic document to the electronic address in accordance with the instructions.

15. The apparatus of claim 14 where in the electronic address is obtained from software operating on the mobile device.

16. The apparatus of claim 14 wherein the electronic address is obtained from a contact list stored on the mobile device.

* * * * *